United States Patent
O'Dell

(10) Patent No.: US 11,499,940 B2
(45) Date of Patent: Nov. 15, 2022

(54) EDDY CURRENT PROBE

(71) Applicant: Zetec Inc., Snoqualmie, WA (US)

(72) Inventor: Tom O'Dell, Maple Valley, WA (US)

(73) Assignee: Zetec, Inc., Snoqualmie, WA (US)

( * ) Notice: Subject to any disclaimer, the term of this patent is extended or adjusted under 35 U.S.C. 154(b) by 76 days.

(21) Appl. No.: 16/746,256

(22) Filed: Jan. 17, 2020

(65) Prior Publication Data

US 2020/0232947 A1 Jul. 23, 2020

Related U.S. Application Data

(60) Provisional application No. 62/795,296, filed on Jan. 22, 2019.

(51) Int. Cl.
*G01N 27/90* (2021.01)
*G01N 27/87* (2006.01)

(52) U.S. Cl.
CPC ......... *G01N 27/9006* (2013.01); *G01N 27/87* (2013.01); *G01N 27/9046* (2013.01)

(58) Field of Classification Search
CPC . G01N 27/9006; G01N 27/87; G01N 27/9046
USPC .................................. 324/219–221
See application file for complete search history.

(56) References Cited

U.S. PATENT DOCUMENTS

| | | | |
|---|---|---|---|
| 4,849,693 A | 7/1989 | Prince et al. | |
| 4,954,778 A | 9/1990 | Champonnois et al. | |
| 5,915,277 A | 6/1999 | Patton | |
| 2003/0227288 A1 | 12/2003 | Lopez | |
| 2007/0126422 A1 | 6/2007 | Crouch et al. | |
| 2010/0097057 A1 | 4/2010 | Karpen | |
| 2010/0231210 A1 | 9/2010 | Harada et al. | |
| 2011/0125462 A1* | 5/2011 | Petrosky | G01N 27/902 702/188 |
| 2012/0043962 A1* | 2/2012 | Wang | G01N 27/9046 324/239 |
| 2012/0265491 A1 | 10/2012 | Drummy | |
| 2015/0338377 A1 | 11/2015 | Gueble et al. | |
| 2018/0164251 A1 | 6/2018 | Hand et al. | |

* cited by examiner

*Primary Examiner* — Judy Nguyen
*Assistant Examiner* — Rahul Maini
(74) *Attorney, Agent, or Firm* — Snyder, Clark, Lesch & Chung, LLP

(57) ABSTRACT

An eddy current instrument for non-destructive testing of a tubular metallic object, the instrument comprising a probe head with probe coils and probe coil signal conditioning and analog to digital conversion electronics and a probe connector module with a processor and probe coil excitation signal generation electronics. The probe connector processor is configured to interface to an external computing device, which may be a personal computer. The probe head and probe connector module may be connected by a rigid shaft or by a flexible coupling.

14 Claims, 3 Drawing Sheets

EDDY CURRENT PROBE

RELATED APPLICATION

This application claims priority under 35 U.S.C. § 119 based on U.S. Provisional Application No. 62/795,296 filed Jan. 22, 2019, the contents of which are hereby incorporated herein by reference in their entirety.

BACKGROUND

Eddy current sensors may be used in non-destructive testing of metal objects. An alternating current is applied to an excitation coil placed in close proximity to the metal object under test. The alternating current in the excitation coil induces an alternating current in the object, which can be sensed either by a separate sensor or by the effect of the metal object on the impedance of the excitation coil. The relationship between the applied current and the sensed signal can indicate the integrity of the object under test and reveal problems such as original manufacturing imperfections, weld integrity, corrosion and wear-related weaknesses.

Eddy current testing of a tubular object may be performed by insertion of one or more coils inside the tube. A single coil can be used for both eddy current excitation and for sensing the effect on the impedance of the coil by the tube or multiple coils may be used, with one or more being used for excitation and one or more being used for sensing induced current. Sensing of induced current may also be by other means including solid state sensors such magneto-resistive sensors and Hall Effect devices.

Eddy current testing of very long tubes such as those used in steam generation requires very long cabling to connect the coils to measurement equipment outside of the tubes. Long cabling between measurement electronics and the probe sensors can result in interference and decreased signal to noise levels. As such, advantages may be gained by including some or all of the measurement electronics closer to the coils in housings that are also in the tube being inspected.

DETAILED DESCRIPTION OF PREFERRED EMBODIMENTS

Those skilled in the art will recognize other detailed designs and methods that can be developed employing the teachings of the present invention. The examples provided here are illustrative and do not limit the scope of the invention, which is defined by the attached claims. The following detailed description refers to the accompanying drawings. The same reference numbers in different drawings may identify the same or similar elements.

Figure 1:
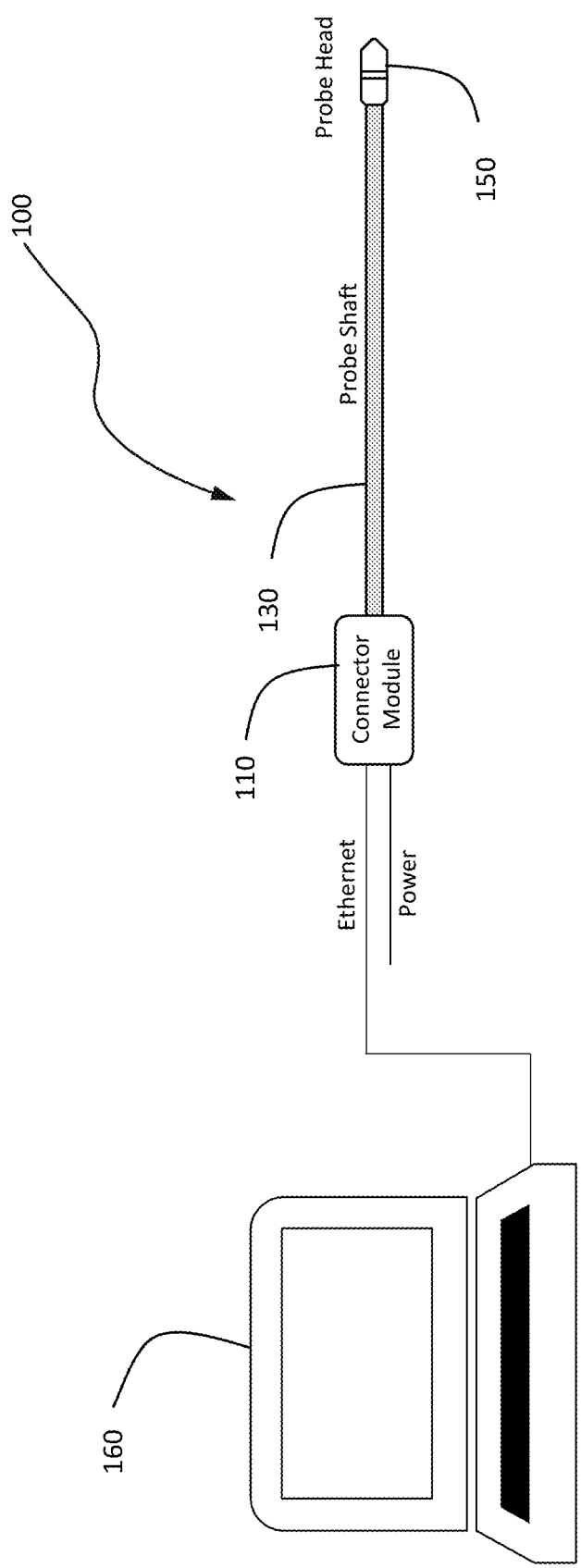
FIG. 1 is a block diagram of an exemplary eddy current probe incorporating signal conditioning and drive circuitry.

Implementations described herein provide an integrated eddy current testing instrument. FIG. 1 shows one exemplary embodiment of an integrated eddy current testing instrument 100. As shown, eddy current testing instrument 100 includes a connector module 110 and a probe head 150, which are connected to each other by a rigid probe shaft 130, through which wires or printed circuit conductors connecting the probe head to the connector module electronics may extend. In a further embodiment, connector module 110 and probe head 150 may be connected by a flexible coupling through which wires or printed circuit conductors may extend. A personal computer 160 may be used to communicate to the probe connector module 110 to set up the instrument configuration and receive a digital data stream for display, monitoring, and analysis. The personal computer may be a conventional desktop or laptop computer or may be a handheld device such as a tablet computer or a mobile phone having processing and data connection capabilities. The personal computer 160 may run dedicated software for configuring, accessing or using the eddy current instrument. Connection between the personal computer 160 and the probe connector module 110 may be by serial wired connection such as an Ethernet or USB connection. The connection between the personal computer 160 and the probe connector module may also be by fiber optic cable. Irrespective of the signal connection means between the personal computer 160 and the probe connector module 110, a power connection is also provided to the probe connector module 110, either directly from the personal computer 160 or from a separate source. Instrument configuration includes setting parameters such as probe excitation waveform(s), frequency and amplitude. In instruments comprising multiple excitation coils and/or multiple sensing coils or solid state sensors, instrument configuration also includes assigning coils as excitation or sensing coils and programming excitation and sensing sequence.

Figure 2:
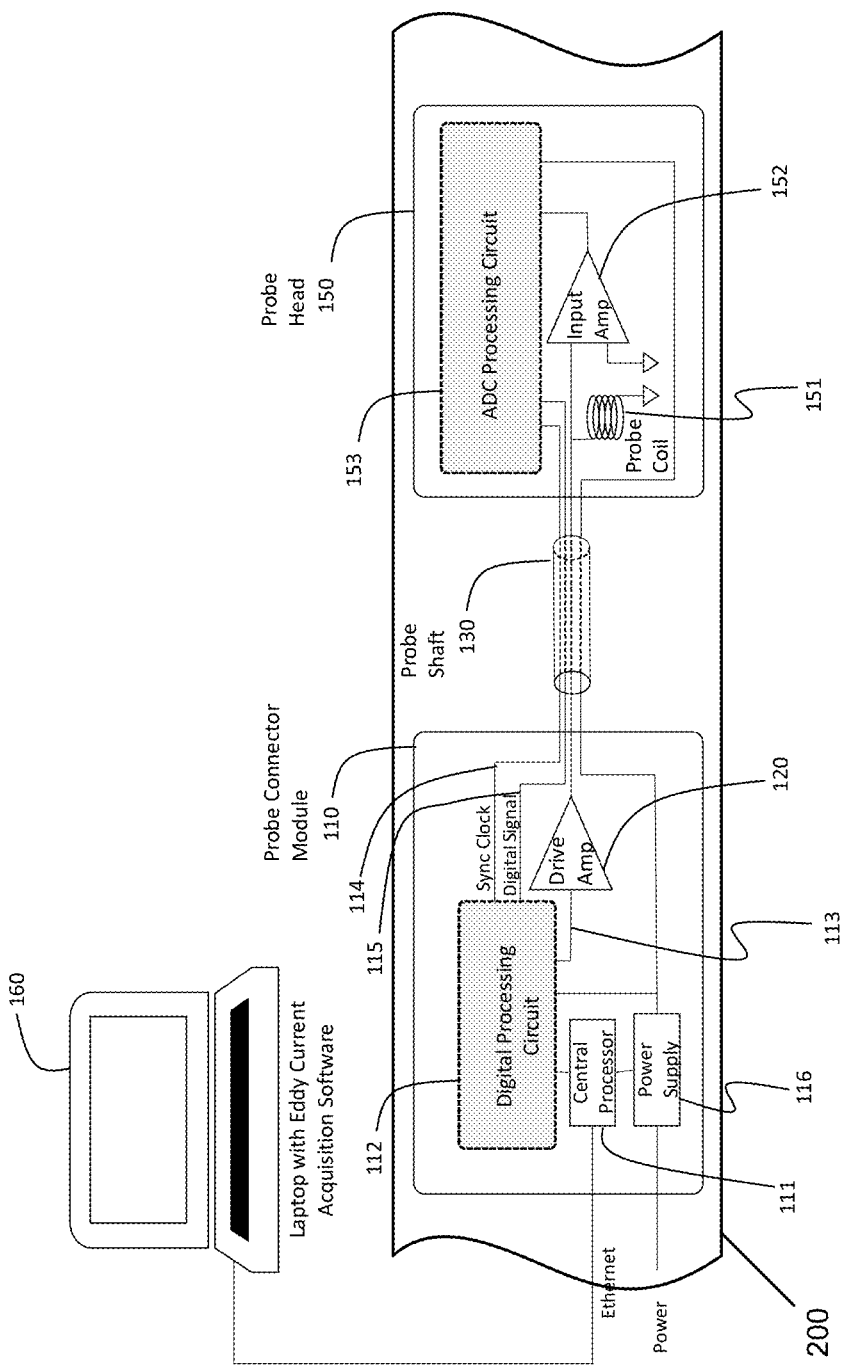
FIG. 2 is detailed block diagram of the eddy current probe of FIG. 1.

Consistent with embodiments described herein and shown in FIG. 2, an exemplary probe connector module 110 comprises a central processor 111, a digital processing circuit 112, and a signal drive amplifier 120. In an embodiment, the central processor 111 runs a program that interfaces to the personal computer 160 and creates signals to drive the digital processing circuit 112 and receives digital data from the digital processing circuit 112. The digital processing circuit 112 may include a logic processor, a system clock, and a frequency wave form generator to create one or more analog drive signals 113 to drive one or more drive amplifiers 120 that supply excitation signals for probe coil or coils 151 in the probe head 150. Analog drive signals may be of a single frequency or multiple frequencies and may be pulsed or steady state. The digital processing circuit 112 may also produce a synchronization clock 114 to drive an analog to digital processing circuit 153 in the probe head 150. The digital processing circuit 112 may also receive one or more digital signals 115 from an analog to digital conversion processing circuit 153 contained in the probe head 150. The probe connector module 110 may also include a power supply 116 to convert power provided externally to the probe connector module 110 to various voltages required by circuitry in the probe connector module 110 and the probe head 150. As also illustrated in FIG. 2, probe connector module 110, probe shaft 130 and probe head 150 may be located in tube 200 under test.

An analog drive signal produced by the drive amplifier 120 along with power and a synchronization clock reference 114 are passed through the probe shaft 150 to the probe head 150 where the probe coils 151 are excited. The clock signal 114 may be used to synchronize time based functions between the digital processing circuit 112 of the probe connector module 110 with the analog to digital conversion (ADC) processing circuit 153 of the probe head 150 electronics. As shown in FIG. 2, the probe head 150 includes an input amplifier 152 to amplify a sensed signal on the probe coil 151 for signal conversion and processing by the ADC processing circuit 153. Probe head 150 may include multiple input amplifiers 152 if there are multiple probe coils 151 or multiple solid state current sensors. The ADC processing circuit 153 may include an analog signal multiplexer in the case where there are multiple input amplifiers 152 connected to multiple probe coils 151 or solid state current sensors.

Figure 3:
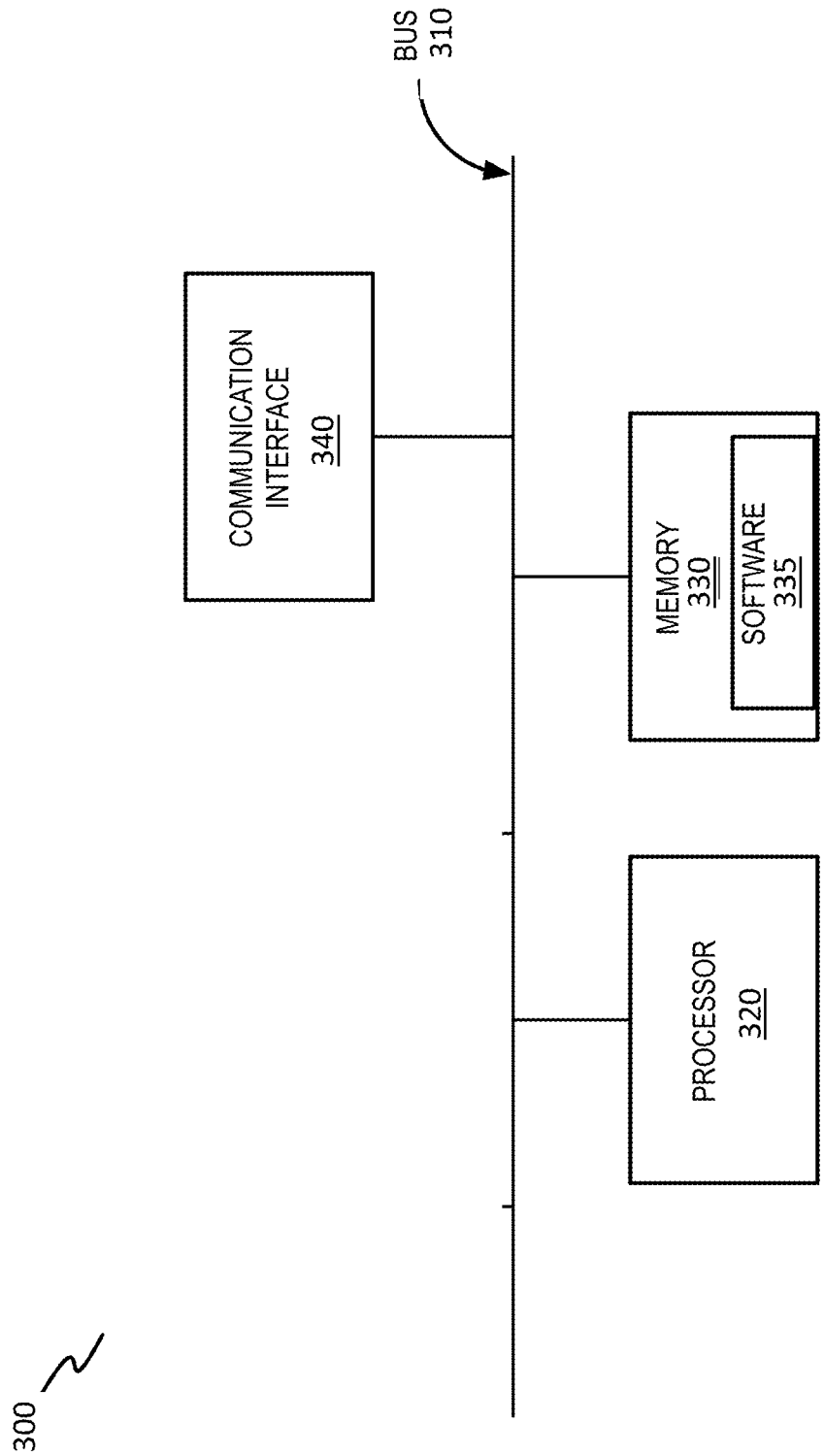
FIG. 3 is a block diagram of an exemplary central processor.

FIG. 3 is a diagram illustrating exemplary physical components of a central processor 300, such as central processor 111 in probe connector module 110, ADC processing circuit 153 in probe head 150, and/or one or more processors in personal computer 160. The central processor may include a bus 301, a processor 320, a memory 330 and a communication interface 340.

Bus 310 may include a path that permits communication among the components of central processor 300. Processor 320 may include a processor, a microprocessor, or processing logic that may interpret and execute instructions. Memory 330 may include any type of dynamic storage device that may store information and instructions, for execution by processor 320, and/or any type of non-volatile storage device that may store information for use by processor 320.

Software 335 includes an application or a program that provides a function and/or a process. Software 335 is also intended to include firmware, middleware, microcode, hardware description language (HDL), and/or other form of instruction. By way of example, with respect to the network elements that include logic to provide proof of work authentication, these network elements may be implemented to include software 335. Additionally, for example, central processor 300 may include software 335 to perform tasks as described above with respect to FIGS. 1 and 2.

Communication interface 340 may include a transceiver that enables the central processor 300 to communicate with other devices and/or systems via wired or fiber optic communications. For example, communication interface 340 may include mechanisms for communicating with another device or system via a network. For example, communication interface 340 may communicate with a network and/or devices connected to a network. Alternatively or additionally, communication interface 340 may be a logical component that includes input and output ports, input and output systems, and/or other input and output components that facilitate the transmission of data to other devices.

Central processor 320 may perform certain operations in response to processor 320 executing software instructions (e.g., software 335) contained in a computer-readable medium, such as memory 330. A computer-readable medium may be defined as a non-transitory memory device. A non-transitory memory device may include memory space within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

Central processor 300 may include fewer components, additional components, different components, and/or differently arranged components than those illustrated in FIG. 3. One or more components of central processor 300 may perform one or more tasks described as being performed by one or more other components of central processor 300.

Although the invention has been described in detail above, it is expressly understood that it will be apparent to persons skilled in the relevant art that the invention may be modified without departing from the spirit of the invention. Various changes of form, design, or arrangement may be made to the invention without departing from the spirit and scope of the invention. Therefore, the above-mentioned description is to be considered exemplary, rather than limiting, and the true scope of the invention is that defined in the following claims.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. An eddy current sensor instrument for non-destructive inspection of a tubular metal object comprising:
a probe head comprising a plurality of probe coils, an input amplifier and an analog to digital convertor;
a probe connector module comprising a signal processor, a digital to analog convertor and a drive amplifier; and
a probe head to probe connector module interface for physically and electrically connecting said probe head to said probe connector module;
wherein said probe connector module is configured to:
connect to a processing device for transmitting probe coil data to the processing device,
receive eddy current instrument configuration information from the processing device, wherein the eddy current instrument configuration information comprises:
information identifying a probe excitation waveform, frequency and amplitude,
information assigning first ones of the plurality of probe coils as excitation coils and second ones of the plurality of probe coils as sensing coils, and
information identifying an excitation and sensing sequence, and generate, via the signal processor, analog drive signals to drive the drive amplifier to supply analog excitation signals to the excitation coils,
wherein the excitation coils are configured to receive the analog excitation signals, and generate an eddy current on the tubular metal object,
wherein the input amplifier is configured to amplify signals associated with the eddy current sensed by the sensing coils,
wherein the analog to digital convertor is configured to receive the amplified signals, convert the amplified signals to digital signals, and forward the digital signals to the signal processor, and
wherein said probe head, said probe connector module and said probe head to probe connector module interface are configured for placement inside the tubular metal object under inspection.

2. The eddy current sensor instrument of claim 1, wherein said probe head to probe connector module interface comprises a rigid shaft.

3. The eddy current sensor instrument of claim 1, wherein said probe head to probe connector module interface comprises a flexible coupling.

4. The eddy current sensor instrument of claim 1, wherein the second ones of the plurality of probe coils act as current sensors.

5. An eddy current sensor instrument for non-destructive inspection of a tubular metal object comprising:
- a probe head comprising a plurality of probe coils, an input amplifier and an analog to digital convertor; and
- a probe connector module comprising a signal processor, a digital to analog convertor and a drive amplifier;
- wherein said probe connector module is configured to:
- connect to a processing device for transmitting digital probe coil data to the processing device, and for receiving eddy current instrument configuration information from the processing device, wherein the eddy current instrument configuration information comprises:
  - information identifying a probe excitation waveform, frequency and amplitude,
  - information identifying an excitation and sensing sequence, and
  - information assigning first ones of the plurality of probe coils as excitation coils and second ones of the plurality of probe coils as sensing coils, and
- generate, via the signal processor, analog drive signals to drive the drive amplifier to supply analog excitation signals to the excitation coils,
- wherein the excitation coils are configured to receive the analog excitation signals, and generate an eddy current on the tubular metal object,
- wherein the input amplifier is configured to amplify signals associated with the eddy current sensed by the sensing coils,
- wherein the analog to digital convertor is configured to receive the amplified signals, convert the amplified signals to digital signals, and forward the digital signals to the signal processor, and
- wherein said probe head and said probe connector module are configured for placement inside the tubular metal object under inspection.

6. The eddy current sensor instrument of claim 5, further comprising a probe head to probe connector module interface comprising a rigid shaft.

7. The eddy current sensor instrument of claim 5, further comprising a probe head to probe connector module interface comprising a flexible coupling.

8. The eddy current sensor instrument of claim 5, further comprising separate probe excitation coils and current sensors.

9. The eddy current sensor instrument of claim 8, wherein said current sensors are coils or solid state sensors.

10. An eddy current sensor instrument for non-destructive inspection of a tubular metal object comprising:
- a probe head comprising a plurality of probe coils, an input amplifier connected to said probe coils and an analog to digital convertor connected to an output of said input amplifier; and
- a probe connector module comprising a signal processor, a digital to analog convertor and a drive amplifier;
- wherein said probe connector module is configured to:
- connect to a processing device for transmitting digital probe coil data from said analog to digital convertor to the processing device,
- receive eddy current instrument configuration information from the processing device, wherein the eddy current instrument configuration information comprises:
- information identifying a probe excitation waveform, frequency and amplitude, and
- information identifying an excitation and sensing sequence, and information assigning first ones of the plurality of probe coils as excitation coils and second ones of the plurality of probe coils as sensing coils, and
- generate, via the signal processor, analog drive signals to drive the drive amplifier to supply analog excitation signals to the excitation coils,
- wherein the excitation coils are configured to receive the analog excitation signals and generate an eddy current on the tubular metal object,
- wherein the input amplifier is configured to amplify signals associated with the eddy current sensed by the sensing coils,
- wherein the analog to digital convertor is configured to receive the amplified signals, convert the amplified signals to digital signals, and forward the digital signals to the signal processor, and
- wherein said probe head and said probe connector module are configured for placement inside the tubular metal object under inspection.

11. The eddy current sensor instrument of claim 10, further comprising a probe head to probe connector module interface comprising a rigid shaft.

12. The eddy current sensor instrument of claim 10, further comprising a probe head to probe connector module interface comprising a flexible coupling.

13. The eddy current sensor instrument of claim 10, further comprising separate probe excitation coils and current sensors.

14. The eddy current sensor instrument of claim 13, wherein said current sensors are coils or solid state sensors.

* * * * *